United States Patent [19]

Skeels et al.

[11] Patent Number: 5,100,644

[45] Date of Patent: Mar. 31, 1992

[54] PROCESS FOR INSERTING SILICON INTO ZEOLITE FRAMEWORKS

[75] Inventors: Gary W. Skeels, Brewster; Diane M. Chapman-Snyder, Ossining; Edith M. Flanigen, White Plains, all of N.Y.

[73] Assignee: UOP, Des Plaines, Ill.

[21] Appl. No.: 627,533

[22] Filed: Dec. 14, 1990

[51] Int. Cl.$^5$ .............................................. C01B 33/34
[52] U.S. Cl. ....................................... 423/328; 502/85; 502/86
[58] Field of Search ............... 423/328, 329, 330, 118; 502/85, 86, 79

[56] References Cited

U.S. PATENT DOCUMENTS

| | | | |
|---|---|---|---|
| 2,331,473 | 10/1943 | Hyman | 502/86 |
| 3,493,519 | 2/1970 | Kerr et al. | 502/86 |
| 3,594,331 | 7/1971 | Elliott, Jr. | 423/328 |
| 3,933,983 | 1/1976 | Elliott, Jr. | 502/86 |
| 4,596,704 | 6/1986 | Miale et al. | 502/86 |
| 4,943,545 | 7/1990 | Chang et al. | 502/86 |

*Primary Examiner*—R. Bruce Breneman
*Attorney, Agent, or Firm*—Thomas K. McBride; Richard G. Miller

[57] ABSTRACT

The removal of aluminum and silicon atoms from the framework of crystalline zeolites and the reinsertion of at least some of the removed silicon atoms into the sites vacated by extracted aluminum atoms is accomplished by the process of contacting the zeolite with an aqueous solution of a bifluoride salt, preferably ammonium bifluoride. The treated zeolites have higher crystal destruction temperatures than their precursor starting zeolites.

12 Claims, No Drawings

PROCESS FOR INSERTING SILICON INTO ZEOLITE FRAMEWORKS

FIELD OF THE INVENTION

The present invention relates in general to a method for substituting silicon atoms for framework aluminum atoms in zeolites, and, more particularly, to the method for silicon insertion wherein a crystalline zeolite is contacted in an aqueous medium with low concentrations of a bifluoride salt under reaction conditions which cause the extraction of aluminum atoms from the crystal lattice and the partial filling of the vacated lattice site by silicon atoms derived from the starting zeolite.

BACKGROUND OF THE INVENTION

Heretofore, three different techniques have been proposed for increasing the framework Si/Al ratio of crystalline zeolites by the extraction of aluminum atoms and the at least partial substitution of silicon atoms into the sites previously occupied by these extracted aluminum atoms. Numerous chemical extraction procedures using mineral acids, chelating agents such as ethylene diaminetetracetic acid (EDTA), solutions of $CrCl_3$, gaseous fluorine, phosgene and the like are also known, but the vacancies left behind by the extracted aluminum atoms are not reoccupied by silicon atoms. In the case of the $CrCl_3$ treatment, however, the substitution of chromium atoms into the vacated sites is reported. In this regard see U.S. Pat. No. 3,937,791, Garwood et al.

Of the prior reported silicon insertion procedures, the earliest and the most thoroughly investigated involves the steaming of a hydrogen or ammonium exchanged form of the starting zeolite at temperatures usually in excess of 550° C. using a steam environment containing at least 2 psia water vapor pressure.

For example, U.S. Pat. No. 3,591,488 discloses that the hydrogen or ammonium form of a zeolite may be treated with steam at a temperature ranging from about 800° F. to about 1500° F. (about 427° C. to about 816° C.), and thereafter cation-exchanged with cations including rare earth cations.

It appears to be generally accepted among those skilled in the art that aluminum atoms extracted from the crystal lattice and moved to the interstitial space are immediately replaced by a "nest" of four hydroxyl groups and that some portion of these hydroxyl nests are in turn replaced by silicon atoms. There is not general agreement as to the source of the replacing atoms, i.e., pre-existing framework silicon atoms or occluded silicon-containing impurities, or the degree to which "healing" of the lattice occurs. It has been shown, however, that steamed faujasite type zeolites develop a secondary mesopore system with pore radii in the range of 15 to 19 A, indicating that the silicon substitution mechanism does involve the migration of framework silicon atoms and possibly the elimination of entire sodalite cages. See in this regard, U. Lohse et al, Z. Anorg. Allg. Chem., 1980, 460, 179.

U.S. Pat. No. 3,493,519 discloses a process for calcining an ammonium-Y zeolite in the presence of rapidly-flowing steam followed by base exchange and treatment of the product with a chelating agent capable of combining with aluminum whereby aluminum is extracted from zeolite Y.

U.S. Pat. No. 4,036,739 discloses a hydrothermally stable and ammonia stable Y-type zeolite intended for use as a cracking catalyst. The zeolite is prepared by partial exchange of ammonium ions for sodium ions, steam calcination under controlled conditions of time, temperature and steam partial pressure, and a second ion-exchange of ammonium ions for sodium ions to reduce the final $Na_2O$ content to below about 1 weight percent. Following the second ion-exchange, the zeolite is calcined for a time sufficient to effect substantial deammoniation but insufficient to reduce the unit cell dimension to below about 24.40 A. According to U.S. Pat. No. 3,781,199, the second calcination may be conducted after the zeolite is admixed with a refractory oxide.

A much later developed technique for silicon insertion is reported by Beyer et al in *Catalysis by Zeolites*, ed. B. Imelik et al (Elsevier, Amsterdam, 1980) p. 203. In this procedure, apparently operable only in the case of zeolites of the faujasite type of structure, the starting zeolite is contacted with silicon tetrachloride vapor at elevated temperatures, typically about 400° C. to 500° C. The reaction which occurs is ideally

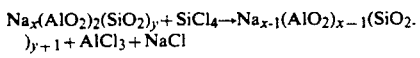
$$Na_x(AlO_2)_2(SiO_2)_y + SiCl_4 \rightarrow Na_{x-1}(AlO_2)_{x-1}(SiO_2)_{y+1} + AlCl_3 + NaCl$$

It is found that the high temperatures employed and the absence of appreciable water vapor during the course of the reaction results in a product zeolite having some silicon inserted into the crystal lattice but having a relatively low cation equivalence value, indicative of conventional decationization as reported in U.S. Pat. No. 3,130,006, Rabo et al.

The third type of silicon insertion technique heretofore proposed is reported in U.S. Pat. No. 4,503,023. In that patent specification Breck and Skeels describe a process for dealuminizing a zeolite by treatment of the zeolite with a fluorosilicate salt in an amount of at least 0.0075 moles per 100 grams of the zeolite (on an anhydrous basis), the fluorosilicate salt being provided in the form of an aqueous solution having a pH in the range of 3 to about 7. The aqueous solution of the fluorosilicate salt is brought into contact with the zeolite at a rate sufficiently slow to preserve at least 80 percent, preferably at least 90 percent, of the crystallinity of the starting zeolite and silicon atoms, as $SiO_4$ tetrahedra, are inserted into the crystal lattice in substitution for aluminum atoms. The fluorosilicate extracts aluminum from the zeolite lattice framework and substitutes silicon therein, thus increasing the $SiO_2/Al_2O_3$ molar ratio of the zeolite without introducing large numbers of defect sites in the framework. The products of this process are referred to as LZ-210.

As already discussed, most of the prior art processes for the dealumination of zeolites introduce so many defects into the lattice framework that the thermal stability of the zeolite is adversely affected. It is known that dealumination alone, which creates unhealed defect sites, does not increase the stability of the zeolite. It is the lattice framework rearrangement caused by the thermal or hydrothermal treatment that causes the stability of the zeolite to increase, as framework aluminum is removed and silicon fills some of the defect sites produced during dealumination. In the other two prior known silicon insertion techniques, it is the insertion of extraneous silicon atoms, i.e., atoms not derived from the zeolite itself, which prevents the formation of permanent defect sites in the crystal lattice and stabilizes the crystal structure. The method used to produce the LZ-210 zeolites appears to be the most effective means for the production of a silicon-enriched framework and one that maintains the ion-exchange capacity of the zeolite. Accordingly, other methods which produce a silicon-enriched framework and also maintain the ion-exchange capacity of the zeolite are desirable. The present invention provides such a method, in which a zeolite is treated with an aqueous solution of a bifluoride salt of which the reactive moiety is presumably the bifluoride ion.

The prior art contains numerous processes involving the treatment of zeolites with various types of halogen-containing compounds, including simple fluorides. These processes are generally intended to provide residual fluoride in the zeolite.

Such processes are described in:

U.S. Pat. No. 3,594,331, in which 2 to 22 grams of available fluoride are provided per 10,000 grams of zeolite to stabilize the zeolite;

U.S. Pat. No. 3,620,960 (treatment of the zeolite with molybdenum fluoride);

U.S. Pat. No. 3,630,965 (treatment of the zeolite with hydrofluoric acid);

U.S. Pat. No. 3,644,220 (treatment of the zeolite with volatile halides selected from the group consisting of aluminum, zirconium, titanium, tin, molybdenum, tungsten, chromium, vanadium, antimony, bismuth, iron, platinum group metals and rare earths);

U.S. Pat. No. 3,575,887 and U.S. Pat. No. 3,702,312 (treatment of the zeolite with fluorides and chlorides);

U.S. Pat. No. 3,699,056 (treatment of the zeolite with halogenated hydrocarbons);

U.S. Pat. No. 4,427,788 (ammoniacal aluminum fluoride solution for treatment of zeolite having silica/alumina ratio greater than 100); and U.S. Pat. No. 4,427,790 (complex fluoroanion treatment of zeolite having a silica/alumina ratio greater than 100).

A variation of such fluoride treatment for zeolites is disclosed in U.S. Pat. No. 3,619,412, which describes treatment of a mixture of mordenite and amorphous silica-alumina with a solution of a fluorine compound such as ammonium fluoride or hydrofluoric acid. The hydrofluoric acid treatment is said to provide stability to mordenite-containing catalysts.

Other processes involving treatments of zeolites having silica/alumina ratios greater than 100 are disclosed in U.S. Pat. No. Nos. 4,427,786; 4,427,787; 4,427,789 and 4,427,791. U.S. Pat. No. 4,427,786 discloses the treatment of supported zeolites with boron trifluoride, hydrolysis of the boron trifluoride, an ammonium salt exchange and calcination. A comparison of Examples 2 and 9 of U.S. P. 4,427,786 shows that the catalytic cracking activity of zeolites having a silica/alumina ratio of less than 70 showed a decrease as a result of this process. U.S. Pat. No. 4,427,787 discloses the treatment of an alumina-supported zeolite with a dilute aqueous solution of hydrogen fluoride; this treatment is claimed to preferentially increase the catalytic cracking activity of zeolites having silica/alumina ratios over 100. U.S. Pat. No. 4,427,789 discloses the treatment of an alumina-supported zeolite with an aqueous solution of an alkali metal fluoride, impregnation with a warm solution of an ammonium salt and calcination. U.S. Pat. No. 4,427,791 discloses a process for the treatment of an inorganic oxide material with ammonium fluoride or boron fluoride, ammonium ion exchange, and calcination. This treatment is claimed to enhance the activity of the inorganic oxide material as a result of the ammonium ion-exchange step.

U.S. Pat. No. 4,324,698 discloses a process for preparing a fluorided zeolite type cracking catalyst consisting essentially of at least 90 percent by weight of a composite of a Y-zeolite in a silica-alumina matrix and containing about 0.1 to about 5 percent by weight of fluorine. The catalyst is prepared by contacting the composite with an amount of aqueous fluorine compound just sufficient for incipient wetting of the composite. The composite is then dried and calcined. The catalyst necessarily contains high concentrations of fluoride.

SUMMARY OF THE INVENTION

This invention provides a process for increasing the framework $Si/Al_2$ molar ratio and the thermal stability of a crystalline zeolite which comprises contacting said zeolite starting material with a solution or slurry comprising a bifluoride salt under conditions effective to cause removal of aluminum and silicon from the zeolite starting material and reinsertion of some of the removed silicon thereinto, thereby producing a zeolite having a crystal collapse temperature higher than that of the starting material. In general the process comprises contacting and reacting a zeolite starting material with an aqueous solution of a bifluoride salt in proportions such that there is from about 0.5 to 10 moles of bifluoride ion per mole of zeolitic framework aluminum, said contact between zeolite and bifluoride salt solution being carried out at a temperature of from about 60° C. to 100° C. and the starting pH of the bifluoride salt solution being not greater than 7, whereby framework silicon and aluminum atoms are removed from the zeolite and at least some of the removed silicon atoms are inserted into sites vacated by removed aluminum atoms and the product zeolite has a crystal collapse temperature higher than that of the starting zeolite.

DETAILED DESCRIPTION OF THE INVENTION

The process of the present invention, unlike other and prior known silicon insertion processes using halogen-containing reagents, does not introduce extraneous silicon atoms into the zeolite framework, but rather, as in the case of hydrothermal (steaming) processes, utilizes silicon derived from the zeolite itself. In this aspect the process is highly surprising in that there is absent the means for silicon transport known to be provided by the steam environment in the conventional hydrothermal processes.

Although we do not want to be bound by any particular theory, it is believed that the bifluoride treatment causes extraction of both aluminum and silicon from the lattice framework of the zeolite starting material (the aluminum reacting with the $H^+$ produced by the bifluoride ion, then being hydrolyzed and reacting with fluoride to form $AlF_3$, which is thermodynamically favored, while the silicon in the zeolite framework is susceptible to attack by the hydrogen fluoride produced by the bifluoride ion, especially where the framework has been fragmented by aluminum removal), with subsequent redeposition of at least some of the silicon into some of the defects left where aluminum atoms were extracted. Thus, in contrast to the processes involving $SiCl_4$ or fluorosilicate salts discussed above, in which the silicon is supplied by an external source, it appears that the process of the present invention achieves silicon resubstitution using the silicon dissolved from the zeolite itself, an "internal" silicon source. While the zeolite product of the present process has a somewhat higher defect structure factor than the starting zeolite, the change in the unit cell constant(s) of the zeolite product is measurably greater than would be the case if simple dealumination had occurred. Obviously and unexpectedly the removal and reinsertion of framework silicon is favorable to the thermal stability of the zeolite product.

It should be noted that the effects achieved by the process of the present invention are not achieved by similar processes using solutions or slurries of simple fluorides, such as sodium, potassium or ammonium fluoride. Although treatment of a zeolite with an aqueous solution or slurry of a simple fluoride can indeed result in extraction of aluminum from the zeolite, the treatment also results in much degradation of the zeolite, with production of amorphous material. In fact, it can be shown that, under certain conditions, ammonium Y zeolite will dissolve in ammonium fluoride solution. In addition, as discussed in more detail below with reference to the Examples, even under milder conditions, treatment of ammonium Y zeolite with ammonium fluoride causes much greater crystal degradation, and much greater increases in defects, than similar treatment with ammonium bifluoride. It appears that these differences between fluoride and bifluoride treatment may be due to the inability of simple fluorides to extract silicon from the zeolite lattice framework, or subtle differences in pH, so that there is no dissolved silicon available to repair some of the defects remaining after aluminum extraction.

The following Table is illustrative of the differences in pH between ammonium fluoride and ammonium bifluoride solutions:

| Salt | pH of a Typical Salt Solution | |
|---|---|---|
|  | NH$_4$F | NH$_4$HF$_2$ |
| 10 wt. % Salt Solution | 7.06 | 5.27 |
| 20 wt. % Salt Solution | 7.63 | 5.26 |

It is well known that silicon species in solution will begin to polymerize at pH greater than about 7.0. While the exact mechanism of silicon substitution into the zeolite framework is not known, we believe that a monomeric silicon species in solution is required to fill a defect site. Thus, the data from the above Table indicate that a bifluoride salt would be more efficacious than the simple fluoride salt in maintaining a monomeric silicon species in solution to react with the vacant sites in the zeolite.

Furthermore, the effects of the treatment with bifluoride in the process of the present invention are not the same as treatment of the same zeolite starting materials with silicofluoride in the process of the aforementioned U.S. Pat. No. 4,503,023. Under similar reaction conditions and at the same fluoride concentration, the bifluoride treatment causes a smaller increase in the silica/alumina ratio of the starting material and a greater increase in the defect structure factor than does the silicofluoride treatment. The ion-exchange capacities of the stabilized zeolites of the present invention are comparable to those of LZ-210. The present stabilized zeolites preferably have a M$^+$/Al ratio of at least about 0.85, preferably in the range of 0.85 to 1.05. In the term M$^+$/Al, the M$^+$ represents monovalent cation species and the Al represents the total aluminum content of the zeolite prior to any ion-exchange procedure using an aluminum salt. The products of the present invention can exhibit greater acidity than prior ar stabilized zeolites produced by thermal or hydrothermal treatment, and this greater acidity is useful in reactions which involve acid catalysis.

The zeolite starting material used in the process of the present invention may be any zeolite having a pore size sufficient to permit entry of the bifluoride ion into the zeolite; in practice, this means any zeolite having a pore size in excess of about 3 A. Thus, the zeolites conventionally used in cracking catalysts can all be subjected to the process of the present invention, since such zeolites need to have a pore size in excess of about 3 A to admit the hydrocarbon components to be cracked. In addition, since the process of the present invention depends upon acid attack upon the zeolite starting material, the starting material should not be one which undergoes excessive degradation of its crystal structure on contact with acid. The suitability of any specific zeolite for use in the present process may easily be determined empirically. The zeolite starting material may be, for example, zeolite Y, zeolite X, mordenite, erionite, chabazite, zeolite N-A (U.S. Pat. No. 3,306,922) zeolite beta (U.S. Pat. No. 3,308,069), zeolite ZK-20, zeolite ZSM-3 (U.S. Pat. No. 3,415,736), ZSM-5, ZSM-11, ZSM-12, ZSM-20 and ZSM-21, FU-1-type zeolites, and mixtures thereof. Because of its high and well-understood activity as a cracking catalyst, the preferred zeolite starting material is zeolite Y.

As is the case with zeolites in general, the thermal stability of the product of the present invention tends to increase with its silica/alumina ratio, and thus a fairly high silica/alumina ratio is desirable in the product. On the other hand, since the present process does produce some increase in the defect structure factor in the product, problems may be encountered if the present process removes a very high proportion of the aluminum in the zeolite starting material. Thus, to avoid any risk of such problems, it is normally desirable to use a starting material with a relatively high silica/alumina ratio. Thus, for example, in the case of the preferred Y zeolites, it is desirable to use a starting material having a silica/alumina ratio in the range of about 3.5 to about 5.5.

Y zeolites having silica/alumina ratios of greater than about 3.5 are disclosed in U.S.p 3,130,007. Examples of Y zeolites believed employable in the present process are those disclosed in U.S. Pat. No. Nos.: 3,835,032; 3,830,725; 3,293,192; 3,449,070; 3,839,539; 3,867,310; 3,929,620; 3,929,621; 3,933,983; 4,058,484; 4,085,069; 4,175,059; 4,192,778; 3,676,368; 3,595,611; 3,594,331; 3,536,521; 3,293,192; 3,966,643; 3,966,882; and 3,957,623. The aforementioned patents are merely representative of Y zeolites having silica/alumina ratios greater than about 3.5 and are not intended to be a complete listing of the Y zeolites employable herein.

As already noted, the degree of increase in thermal stability of the zeolite starting material produced by the process of the present invention (as indicated, for example, by the increased crystal collapse temperature measured by the differential thermal analysis method (see T. C. Daniels, Thermal Analysis, Wiley, New York (1973), pages 73-135) is highly correlated with the increase in silica/alumina ratio produced by the process. To produce significant increases in stability of a Y zeolite starting material, it is desirable to carry out the process so as to produce a product with a silica/alumina ratio of 6.0 or more, the increase in silica/alumina ratio essentially being limited by the maximum defects which can be tolerated in the product.

The zeolite starting material may be in any chemical form which permits it to react properly with the bifluoride salt solution or slurry. However, it is preferred that the starting material be in its ammonium form, since this form not only permits ready reaction with the bifluoride solution or slurry, but also leaves the product in its ammonium form, which can readily be converted by heating to its acid form, this acid form being the form which is active in the catalytic cracking process. As is well known to those skilled in molecular sieve technology, the ammonium form of a zeolite is readily prepared from the as-synthesized form of the zeolite (which contains the alkali metal or organic templating agent used in the synthesis of the zeolite) by ion-exchange with a solution of an ammonium salt.

Because it is desirable that the product of the process of the present invention be produced in its ammonium form, the preferred bifluoride salt for use in the process is ammonium bifluoride. However, other soluble bifluorides, for example sodium bifluoride and potassium bifluoride, may alternatively be used if desired. For economy and convenience, the solution or slurry of the bifluoride will normally be an aqueous solution or slurry, but we do not exclude the possibility of using non-aqueous solutions and slurries in other solvents, provided such other solvents permit the formation of bifluoride ion and the development of sufficient acidity for the process to operate in the same way as in aqueous media.

The optimum concentration of bifluoride ion in the solution or slurry used to treat the zeolite starting material varies with a large number of factors, including the specific zeolite being treated, the reaction conditions and the change desired in the silica/alumina ratio of the zeolite. Solutions having bifluoride salt concentrations of from about $10^{-3}$ moles per liter of solution up to saturation can generally be employed in the process. However, in general it is preferred that the solution or slurry contain from about 0.5 to about 10, and desirably from about 0.8 to about 10, moles per liter of bifluoride. In the case of slurries, of course, the relevant concentration of bifluoride is that of dissolved bifluoride, since any solid bifluoride suspended in the slurry has no effect until it becomes dissolved. Even very slightly soluble bifluoride salts can be slurried in a solvent, e.g., water, and used as a reagent, with the undissolved solids being readily available to replace dissolved molecular species consumed in treatment of the zeolite.

Similarly, the temperature at which the process of the present invention should be carried out varies with a large number of factors, including the specific zeolite being treated and the change desired in the silica/alumina ratio of the zeolite. Increasing the reaction temperature usually increases the reaction rate, but also tends to increase degradation of the crystal structure; as is well known to those skilled in molecular sieve technology, degradation of the crystal structure is highly undesirable, because the catalytic activity of the molecular sieve depends upon the maintenance of the microporous structure. Accordingly, the reaction temperature should be controlled to limit crystal structure degradation, and retain as high a proportion as possible of the crystallinity of the zeolite starting material. In general, it is preferred to carry out the process of the present invention at a temperature in the range of about 60° C. to about 100° C. Furthermore, it is preferred to carry out the reaction so that at least about 66, and desirably about 75, percent of the crystallinity of the zeolite starting material is retained.

Although various techniques for measuring crystallinity of zeolites are well known in the art, all references herein to numerical ratios of crystallinity are to X-ray crystallinities. Such crystallinities are calculated by comparison of the total areas under all the peaks in the X-ray powder diffraction pattern of the product of the process of the present invention with that of the zeolite starting material. The sum of the areas, in terms of arbitrary units above background, of the starting material is used as the standard and is compared with the corresponding sum of the areas in the product. When, for example, the numerical sum of the areas of the product is 85 percent of the value of the sum of the areas of the starting zeolite, then 85 percent of the crystallinity has been retained. Although there are other indicia of the crystallinity retained by the product (for example, X-ray crystallinities calculated using a) the sum of the peak heights; b) the sum of only a portion of the peak heights, as for example, five of the six strongest d-spacings, which in the case of zeolite Y correspond to the Miller Indices 331, 440, 533, 642 and 555; c) the degree of retention of surface area as measured by the well-known Brunauer-Emmet-Teller method (B-E-T). J. Am. Chem. Soc., 60.309 (1938) using nitrogen as the adsorbate; or d) the capacity for oxygen adsorption at $-183°$ C. at 100 Torr, give similar results), as already noted, it is the comparison of total areas under the X-ray peaks which is relied upon herein.

The X-ray patterns required for calculation of X-ray crystallinities may be obtained by standard X-ray powder diffraction techniques. The radiation source is a high-intensity, copper target, X-ray tube operated at 50 $K_\alpha$ and 40 ma. The diffraction pattern from the copper $K_\alpha$ radiation and graphite monochromator is suitably recorded by an X-ray spectrometer scintillation counter, pulse height analyzer and strip chart recorder. X-ray patterns are obtained using flat compressed powder samples which are scanned at 2° (2Θ) per minute, using a two second time constant. Interplanar spacings (d) in Angstrom units are obtained from the position of the diffraction peaks expressed as 2Θ where Θ is the Bragg angle as observed on the strip chart. Areas under the diffraction peaks (after subtracting background) are obtained by standard integration techniques which will be familiar to those skilled in X-ray crystallography. Alternatively, the X-ray patterns may be obtained by use of computer based techniques using Siemens D-500 X-ray powder diffractometers with copper $K_\alpha$ radiation and Siemens type K-805 X-ray sources, such being available from Siemens Corporation, Cherry Hill, N.J.

Since the process of the present invention involves acid attack upon aluminum and silicon in the lattice framework of the zeolite starting material, the reaction rate is pH-dependent. The reaction appears to require the dissolution of sufficient silicon to enable placement of silicon atoms in at least a large proportion of the defects created by removal of aluminum from the lattice framework. Thus, if the reaction is conducted at too high a pH little silicon will be dissolved and sufficient silicon will not be available for placement in the lattice framework, so that the product will suffer from an excess of defects. Accordingly, it is preferred that the process of the present invention be carried out at a pH not greater than about 7. Very low pH values may, however, cause too rapid a reaction between the bifluoride and the aluminum in the zeolite, with consequent excessive degradation of the crystal structure, and should hence be avoided. In general, the use of bifluoride solutions having pH values below about 3 is not recommended. The usable pH range is also limited by the acid stability of the zeolite.

It has been found that the degree of crystal degradation occurring during the process of the present invention is significantly affected by the technique used to contact the zeolite starting material with the bifluoride solution. Prolonged contact of any portion of the starting material with a solution or slurry containing a high concentration of dissolved bifluoride tends to cause excessive crystal structure degradation in that portion of the starting material, and hence should be avoided. Accordingly, it may be desirable to carry out the process by adding the bifluoride solution or slurry slowly to a mass of the zeolite starting material, with constant stirring or other form of agitation to ensure that no portion of the starting material undergoes prolonged exposure to unchanged solution or slurry.

It is readily accomplished to carry out the present process by controlling the various process parameters so that the product zeolite has a silica/alumina ratio greater than about 6.0, a defect structure factor of not more than about 0.08, and a $M^+/Al$ ratio of at least about 0.85. Typically, the stabilized zeolite produced by the present process will have a crystal collapse temperature at least about 25 C higher than those of the zeolite starting material. The determination of the defect structure factor is made according to the procedure set forth in U.S. Pat. No. 4,503,023, issued Mar. 5, 1985, the disclosure of which is incorporated herein by reference.

The following examples were carried out to demonstrate the process of the present invention, but are given solely by way of illustrating the invention and are not intended to be limitative of the invention.

EXAMPLE 1-6

Samples of $NH_4$- exchanged Y zeolite having a silica/alumina ratio of 5.08 and a cation equivalent $M^+/Al$ of 0.95 were treated with varying quantities of aqueous slurries of ammonium bifluoride, as set forth in Table 1 below. The zeolite samples were each placed in a separate vessel, and the ammonium bifluoride slurry added slowly over a period of 90 minutes, with the vessel and the slurry being maintained at 75° C. throughout this period. After the addition of the ammonium bifluoride slurry had been completed, the resultant mixture was maintained at 75° C. for a further 3 hours, after which the solid zeolite product was separated by filtration, washed with water and dried in air at room temperature.

Table 1 gives details of the proportions of the reactants employed in the production of the stabilized zeolites, while Table 2 gives details of the properties of the stabilized zeolites themselves. In Table 2, there are given the X-ray crystallinity (calculated as described above), the unit cell dimension, the infra-red asymmetric and symmetric stretching frequencies, the absolute absorbance at 3710 $cm^{-1}$ and the crystal collapse temperature (determined as per the Daniels book mentioned above, at a temperature increase of 20° C. per minute). The respective products were tested in n-butane cracking and their activity values ($k_A$) compared in Table 2 with those of the starting zeolite, following procedures established by Rastelli et al as published in the "Canadian Journal of Chemical Engineering"; 60, 44–49; 1982. Also given in Table 2 are the defect structure factors, z, for the various products.

The asymmetric stretching frequencies given in Table 2 are, as is well-known to those skilled in the zeolite art, related to the silica/alumina ratio of the product, the asymmetric stretching frequency increasing with the silica/alumina ratio. Thus, these asymmetric stretching frequencies are a measure of the degree of dealumination of the zeolite framework effected by the process of the present invention. The silica/alumina ratios given in Table 2 were obtained by chemical analysis. From the data in Table 2, it will be seen that, with increasing amounts of bifluoride treatment, the chemically-measured silica/alumina ratio increases, as does the asymmetric stretching band frequency.

The symmetric stretching frequencies given in Table 2 are, as is well-known to those skilled in the zeolite art, related to whether silicon resubstitution takes place. It is known that simple dealumination of a zeolite produces little or no change in the symmetric stretching frequency. If, however, substitution of silicon into vacancies in the lattice framework occurs, the unit cell dimension decreases and the symmetric stretching band frequency increases. From the data in Table 2, it will be seen that, with increasing amounts of bifluoride treatment, the chemically-measured silica/alumina ratio increases (as already mentioned), and the symmetric stretching band frequency increases with the resultant increase in silica/alumina ratio.

The unit cell dimensions given in Table 2 (which were taken on fully-hydrated specimens of the zeolites) are a further measure of the extent to which resubstitution of silicon into the framework occurs during the process of the present invention. It is known that the unit cell dimension of a fully-hydrated zeolite is related to its silica/alumina ratio, the unit cell dimension decreasing with increasing silica/alumina ratio. However, simple dealumination of a zeolite produces little or no change in the unit cell dimension, whereas a framework into which silica has been resubstituted does undergo a decrease in unit cell dimension. It should be noted that the unit cell dimension is related to framework silica/alumina ratio, and unlike chemical analysis is little affected by aluminum which may be present in non-framework forms (such as within the pores of the framework).

An increase in catalytic activity (with increasing $SiO_2/Al_2O_3$ as measured by the activity values obtained from the n-butane cracking test is expected. Increased activity is typical of zeolites with increased stability due to a higher $SiO_2Al_2O_3$ in the framework and maintenance of acid ($NH_4^+$) ion exchange capacity as measured by the cation ratio to aluminum $M^+/Al$.

TABLE 1

| | Example No | | | | | |
|---|---|---|---|---|---|---|
| | 1 | 2 | 3 | 4 | 5 | 6 |
| Zeolite (gm.) | 493 | 493 | 500 | 100 | 100 | 100 |
| Zeolite conc., (wt. percent) | 16.7 | 16.7 | 16.6 | 16.6 | 16.6 | 16.6 |
| $NH_4HF_2$ (gm.) | 52.8 | 69.3 | 119.3 | 40.8 | 51.6 | 59.1 |
| $NH_4HF_2$ (wt. percent) | 10.0 | 12.2 | 16.6 | 20 | 20 | 20 |
| $NH_4HF_2$ (moles) | 0.926 | 1.215 | 2.092 | 0.715 | 0.905 | 1.036 |
| Aluminum in zeolite (moles) | 2.106 | 2.106 | 2.136 | 0.427 | 0.427 | 0.427 |
| F/Al (atomic | 0.879 | 1.157 | 1.958 | 3.345 | 4.235 | 4.851 |

TABLE 1-continued

| | Example No | | | | | |
|---|---|---|---|---|---|---|
| | 1 | 2 | 3 | 4 | 5 | 6 |
| ratio) | | | | | | |
| Slurry pH (after digestion) | — | — | 7 | 7 | 7 | 7 |

TABLE 2

| | Example No. | | | | | | Starting NH$_4$-Y zeolite |
|---|---|---|---|---|---|---|---|
| | 1 | 2 | 3 | 4 | 5 | 6 | |
| Chemical analysis, (wt. percent or molar ratio) | | | | | | | |
| Na$_2$O | 2.5 | 2.2 | 2.0 | 1.6 | 1.3 | 1.0 | 2.3 |
| (NH$_4$)$_2$O | 8.9 | 7.9 | 7.0 | 6.9 | 5.9 | 5.4 | 9.9 |
| Al$_2$O$_3$ | 22.5 | 19.8 | 18.2 | 17.8 | 14.5 | 12.9 | 21.9 |
| SiO$_2$ | 74.4 | 69.5 | 70.8 | 81.6 | 76.9 | 79.2 | 65.2 |
| F$_2$ | 0.21 | 0.02 | 0.02 | 0.03 | .11 | 0.10 | 0.0 |
| Na$^+$/Al | 0.18 | 0.18 | 0.18 | 0.15 | 0.14 | 0.13 | 0.18 |
| NH$_4$$^+$/Al | 0.77 | 0.78 | 0.75 | 0.76 | 0.80 | 0.82 | 0.89 |
| M$^+$/Al | 0.95 | 0.96 | 0.93 | 0.91 | 0.94 | 0.95 | 1.07 |
| SiO$_2$/Al$_2$O$_3$ | 5.61 | 5.97 | 6.60 | 7.79 | 9.00 | 10.38 | 5.08 |
| X-ray analysis | | | | | | | |
| Crystallinity (%) | 106 | 104 | 96 | 97 | 82 | 75 | 100 |
| Unit cell (Å) | 24.674 | 24.660 | 24.622 | 24.570 | 24.540 | 24.510 | 24.714 |
| Infra-red analysis | | | | | | | |
| Asym. str. (cm$^{-1}$) | 1026 | 1027 | 1033 | 1041 | 1049 | 1053 | 1019 |
| Sym. str. (cm$^{-1}$) | 790 | 790 | 795 | 802 | 807 | 810 | 787 |
| Abs. absorbance at 3710 cm$^{-1}$ | 0.062 | 0.062 | 0.073 | 0.146 | 0.145 | 0.179 | 0.050 |
| Defect Structure Factor (z) | 0.026 | 0.026 | 0.031 | 0.062 | 0.062 | 0.076 | 0.021 |
| Crystal collapse temperature (°C.) | 917 | 920 | 968 | 1016 | 1052 | 1076 | 878 |
| n-butane cracking, (rate constant k$_4$ | — | — | 1.5 | 4.5 | 4.5 | 4.7 | 1.7 |

The data given in Tables 1 and 2 fully support the statements made earlier in this application regarding the advantageous results achieved by the process of the present invention, and the mechanism by which the reaction between the zeolite and the bifluoride is believed to occur.

It will be seen from the data in Tables 1 and 2 that the process of the present invention produces very significant increases in the silica/alumina ratio of the zeolite starting material, although this increase in the silica/alumina ratio is less than that achieved by the use of the same fluorine/aluminum ratio in the Breck and Skeels process. Although the process of the present invention does cause some increase in the defect structure factor of the zeolite starting material, calculation shows that this increase in the defect structure factor is much lower than would be expected if the increase in silica/alumina ratio of the zeolite were solely due to simple dealumination, i.e., simple removal of aluminum from the zeolite without any resubstitution of silicon into the defect sites left behind where the aluminum has been extracted.

The unit cell dimensions and the symmetric stretching frequencies given in Table 2 also confirm that silicon resubstitution occurs during the process of the present invention. As previously noted, simple dealumination does not produce large changes in the unit cell dimension, whereas the significant decreases in unit cell dimension and the significant increases in symmetric stretching frequency achieved in the foregoing Examples are entirely consistent with silicon resubstitution into defects produced by dealumination of the zeolite. Moreover, without silicon resubstitution, it is difficult to explain the large increases in crystal collapse temperatures, since simple dealumination would be expected to produce decreases in the crystal collapse temperature.

Accordingly, it will be seen from the data in Table 2 that the process of the present invention can achieve large increases in the silica/alumina ratio of a zeolite without excessive increases in the defect structure factor and while still leaving the zeolite with a substantial ion-exchange capacity (as shown by the M$^+$/Al ratios in Table 2). Maintenance of the ion-exchange capacity utilizes all of the potential acidity in the zeolite resulting in greater catalytic activity. Furthermore, the process of the present invention has been shown to produce major increases in the crystal collapse temperature of the zeolite; such an increase in the crystal collapse temperature is commercially useful since it permits the zeolite to be used in reactions occurring at higher reaction temperatures.

COMPARATIVE EXAMPLES 7-10

To show that the advantageous results obtained by the process of the present invention, as illustrated in Examples 1-6, are not obtained by treatment of the zeolite with solutions of simple fluorides, the same Y zeolite as in Examples 1-6 was fluoride-treated in the same manner as in those Examples, but using solutions containing various amounts of ammonium fluoride rather than ammonium bifluoride. The results are given in Tables 3 and 4 below, which set forth exactly the same parameters as Tables 1 and 2 respectively. For convenience, the values for the starting zeolite given in Table 2 above are repeated in Table 4 below.

TABLE 3

| | Example No. | | | |
|---|---|---|---|---|
| | 7 | 8 | 9 | 10 |
| Zeolite (gm.) | 500 | 500 | 739 | 739 |
| Zeolite conc. (wt. percent) | 16.6 | 16.6 | 20.2 | 24.0 |

TABLE 3-continued

|  | Example No. | | | |
|---|---|---|---|---|
|  | 7 | 8 | 9 | 10 |
| NH$_4$F (gm.) | 54.56 | 154.6 | 390.4 | 495.4 |
| NH$_4$F (wt. percent) | 15.4 | 17 | 44 | 50 |
| NH$_4$F (moles) | 1.473 | 4.174 | 10.539 | 13.376 |
| Aluminum in zeolite (moles) | 2.136 | 2.136 | 3.157 | 3.157 |
| F/Al (atomic ratio) | 0.690 | 1.954 | 3.338 | 4.237 |

TABLE 4

|  | Example No. | | | | Starting NH$_4$-Y Zeolite |
|---|---|---|---|---|---|
|  | 7 | 8 | 9 | 10 |  |
| Chemical analysis (wt. percent or molar ratio) | | | | | |
| Na$_2$O | 2.4 | 2.2 | 2.0 | 1.5 | 2.3 |
| (NH$_4$)$_2$O | 8.7 | 7.6 | 8.0 | 6.6 | 9.9 |
| Al$_2$O$_3$ | 21.4 | 20.0 | 17.9 | 15.2 | 21.9 |
| SiO$_2$ | 67.5 | 69.2 | 71.4 | 75.7 | 65.2 |
| F$_2$ | 0.01 | 0.09 | 1.80 | 0.26 | 0.0 |
| Na$^+$/Al | 0.19 | 0.18 | 0.18 | 0.16 | 0.18 |
| NH$_4$/Al | 0.79 | 0.75 | 0.87 | 0.85 | 0.89 |
| M$^+$/Al | 0.98 | 0.93 | 1.05 | 1.01 | 1.07 |
| SiO$_2$/Al$_2$O$_3$ | 5.34 | 5.87 | 6.78 | 8.43 | 5.08 |
| X-ray analysis | | | | | |
| Crystallinity (%) | 106 | 80 | 68 | 68 | 100 |
| Unit cell (A) | 24.695 | 24.680 | 24.684 | 24.661 | 24.714 |
| Infra-red analysis | | | | | |
| Asym. stretch (cm$^{-1}$) | 1023 | 1026 | 1030 | 1036 | 1019 |
| Sym. stretch (cm$^{-1}$) | 788 | 789 | 780 | 790 | 787 |
| Absolute absorbance at 3710 cm$^{-1}$ | 0.062 | 0.059 | 0.101 | 0.312 | 0.050 |
| Defect Structure Factor (z) | 0.026 | 0.025 | 0.043 | 0.132 | 0.021 |
| Crystal collapse temperature (°C.) | 877 | 909 | 810 | 940 | 878 |

It will be seen, by comparing Tables 3 and 4 with Tables 1 and 2, that the advantages achieved using the bifluoride treatment process of the present invention are not achieved by similar processes using simple fluorides. The increase in silica/alumina ratio effected with the simple fluoride was somewhat less than with bifluoride; for example, whereas the product of Example 5 had a silica/alumina ratio of 9.00, the corresponding product produced with the simple fluoride in Example 9 had a silica/alumina ratio of 8.43. More significantly, the product of Example 9 showed much greater crystal degradation, having an X-ray crystallinity of only 68 percent, as opposed to the 82 percent achieved in Example 5. In addition, the product of Example 9 had a much greater defect structure factor, 0.132, as opposed to the factor of 0.062 found in Example 5. Finally, the product of Example 9 showed a lower asymmetric stretching frequency (1036 cm$^{-1}$ versus 1049 cm$^{-1}$ in Example 5), a lower symmetric stretching frequency (790 cm-1 versus 807 cm$^{-1}$ in Example 5), a larger unit cell dimension (24.661 A versus 24.540 in Example 5), and a much lower crystal collapse temperature (940° C. versus 1076° C. in Example 5).

The results obtained in the experiments using ammonium fluoride are entirely consistent with the view that the simple fluoride causes a dealumination of the zeolite, but does not cause dissolution of silicon therefrom, and thus is unable to effect resubstitution of silicon into the defects caused by the removal of aluminum atoms. Thus, unlike bifluoride, simple fluorides cause greater degradation of the crystal structure and leave a product with a high defect structure and a relatively low crystal collapse temperature. Such products obtained by simple fluoride are ill-adapted for use in cracking and hydrocracking catalysts.

COMPARATIVE EXAMPLES 11-14

To illustrate the differences between the stabilized zeolites produced by the process of the present invention, samples of an NaY zeolite similar to that used in Example 1 were treated by various prior art stabilization processes, namely:

Example 11: Ultrastable Y zeolite (see U.S. Pat. No. 3,449,070);

Example 12: EDTA-extracted Y zeolite (see Kerr, J. Phys. Chem., 72: 2594 1968);

Example 13: Acetylacetone-treated Y (see U.S. Pat. No. 3,640,681); and

Example 14: LZ-210, prepared as described above.

Table 5 below shows most of the same parameters of the resultant products as in Tables 2 and 4 above; apart from Example 11, which cannot be raised to a silica/alumina ratio of 9, the treatment conditions in each case were chosen to produce a product with a silica/alumina ratio of approximately 9.

For comparison, Table 5 includes data from Example 5, as well as data for a bifluoride treated NH$_4$Y, the NaY zeolite starting material and for the ammonium-exchanged form of this zeolite.

TABLE 5

|  | NaY | NH4Y | Example No. | | | | |
|---|---|---|---|---|---|---|---|
|  |  |  | 5 | 11 U.S.-Y | 12 EDTA Y | 13 AcAc Y | 14 LZ-210 |
| SiO$_2$Al$_2$O$_3$ | 4.84 | 4.88 | 9.00 | 5.15 | 9.50 | 8.59 | 9.50 |
| M$^+$/Al | 1.0 | 0.98 | 0.94 | 0.01 | 1.0 | 0.85 | 0.99 |
| X-ray analysis | | | | | | | |
| Crystallinity (%) | 100 | 100 | 82 | 07 | 68 | 62 | 99 |
| Unit cell (A) | 24.689 | 24.677 | 24.540 | 24.282 | 24.652 | 24.58 | 24.52 |
| Infra-red analysis | | | | | | | |
| Asym. str. (cm$^{-1}$) | 1018 | 1014 | 1049 | 1080 | 1033 | 1037 | 1046 |
| Sym. str. (cm$^{-1}$) | 791 | 786 | 807 | 837 | 794 | 792 | 812 |
| Abs. Absorbance at 3710 cm$^{-1}$ | 0.000 | 0.007 | 0.145 | 0.150 | 0.330 | 0.446 | 0.045 |
| Defect Str. Factor (z) | 0.000 | 0.003 | 0.062 | 0.064 | 0.140 | 0.189 | 0.019 |
| Crystal collapse Temperature. (°C.) | 940 | 875 | 1052 | 1004 | 980 | 996 | 1061 |

From the data in Table 5, it will be seen that only LZ-210 has parameter values similar to those of the product of Example 5. Except for LZ-210, the other prior art products have much lower crystal collapse temperatures, and (except for ultrastable Y), lower symmetric stretching frequencies and higher defect structure factors. Ultrastable Y, which has all the properties indicative of a framework rich in SiO$_2$, has an extremely low cation equivalent, which would make this material substantially less acidic in a catalytic environment.

The data in Table 5 are consistent with the view that only the LZ-210 process and the process of the present invention achieve silicon substitution into the lattice framework while maintaining cation exchange capacity, whereas the processes used to produce ultrastable Y, EDTA Y and AcAc Y do not.

The zeolite products of the present process, particularly those resulting from the use of zeolite Y as the starting material are useful in the same manner as zeolite compositions generally. They are useful as hydrocarbon conversion catalysts or catalyst bases, particularly in cracking and hydrocracking reactions.

Catalytic cracking and hydrocracking with the catalysts of the present invention can be conducted in any conventional manner. Suitable catalytic cracking conditions include a temperature ranging from about 400° F. to about 1300° F. and a pressure ranging from about subatmospheric to several atmospheres, typically from about atmospheric to about 100 psig. The process may be carried out in a fixed bed, moving bed, ebullating bed, slurry, transferline, riser reactor or fluidized bed operation. The catalyst of the present invention can be used to convert any of the conventional hydrocarbon feeds used in catalytic cracking, that is, it can be used to crack naphthas, gas oil and residual oils having a high content of metal contaminants. Because of its high thermal stability, it is especially suited for cracking hydrocarbons boiling in the gas oil range, i.e., hydrocarbon oils having an atmospheric pressure boiling point ranging from about 420° to about 1100° F. to naphthas, to yield products having a lower boiling point than the initial feed.

In the hydrocracking catalysts, the stabilized zeolites will typically be employed in conjunction with a hydrogenation component of the type which are commonly employed in hydrocracking catalysts. The hydrogenation component is generally selected from the group of hydrogenation catalysts consisting of one or more metals of Group VIB and Group VIII, including the salts, complexes and solutions containing such. The preferred hydrogenation catalyst is selected from the groups of Group VIII metals, these salts and complexes thereof and is most preferably selected as a salt or complex of at least one noble metal of platinum, palladium, rhodium, iridium and mixtures thereof, and/or at least one base metal of nickel, molybdenum, cobalt, tungsten, titanium, chromium and mixtures thereof. As recognized in the art, the noble and base metals will not generally be employed in the same catalyst system; in particular, in the preferred high activity, high octane variant of the present invention, the hydrogenation component desirably comprises one or more base metals. The hydrogenation component is present in an effective amount to provide the hydrogenation function of the hydrocracking catalyst and for noble metals is generally present in an amount between about 0.05% and about 1.5% by weight based on the total weight of the hydrocracking catalyst including the weight of any binder or matrix material which may be present, as hereinafter discussed, although effective amounts outside this range may be employed. Although effective amounts in excess of 1.5 percent by weight may be employed, the preferred effective amount of hydrogenation component is between about 0.3% and about 1.2% by weight. When the hydrogenation catalyst is a base metal(s) the effective amount will generally be between about 5% and about 30% percent by weight or more of the base metal oxide(s) based on the total weight of the hydrocracking catalyst.

The conditions used in the hydrocracking process of the present invention are substantially similar to those used in prior art hydrocracking processes, which are well known to those skilled in the petroleum refining art. The hydrocarbon feedstock to be charged to the hydrocracking unit typically boils above about 300° F. (410° C.), preferably between about 350° and 1200° F. (between about 177° and about 649° C.) and more preferably between about 420° and about 900° F. (between about 216° and about 482° C.). The hydrocarbon feedstock may be derived from many sources including catalytic cracking processes, coking processes, fractionators from crude oil, hydroprocessing, pyrolysis processes and others. When operating a hydrocracking process to maximize gasoline production, the typical feedstock currently in commercial use has an end boiling point not greater than about 800° F. (427° C.). Typically, a light catalytic cycle oil, or a light virgin gas oil, or mixtures thereof, boiling in the range of from about 300. to 800° F. (149° to 427° C.) is employed as the feedstock. The feedstock may be pre-treated in a hydrotreater to reduce the content of organic compounds which contain sulfur and/or nitrogen. The feedstock may have a significant sulfur content, present as hydrogen sulfide, ranging from 0.1 to 3 weight percent, and nitrogen content, present as ammonia, in an amount up to 4000 parts per million, or even more. Temperature, space velocity, and other process variables may be adjusted to compensate for the effects of nitrogen on the hydrocracking catalyst activity.

The feedstock is contacted in the hydrocracking reaction zone with the hydrocracking catalyst in the presence of hydrogen-containing gas. Hydrogen is consumed in the hydrocracking process and an excess of hydrogen is typically maintained in the reaction zone. Advantageously, a hydrogen-to-oil (feedstock) ratio of at least 1,000 standard cubic feet per barrel of feed (SCFB) (28.3 standard m$^3$ per barrel) is employed.

The hydrocracking reaction zone is typically operated under conditions of elevated temperature and pressure. The total hydrocracking pressure usually is between about 400 and about 4,000 pounds per square inch gauge (psig.) (between about 2.76 and about 27.6 MPa.), and preferably between about 500 and 2000 psig. (between about 3.45 and 13.8 MPa.). The hydrocracking reaction is exothermic and a temperature rise occurs across the catalyst bed. Therefore, the inlet temperature to the hydrocracking reaction zone may be 10° to 40° F. (5.6. to 22.2° C.) lower than the exit temperature. The average hydrocracking catalyst bed temperature is usually between about 450° and 800° F. (between about 232° and 427° C.), depending upon the presence or absence of ammonia and the age of the catalyst; however, in view of the fact that the preferred catalysts of the present invention possess significantly greater activity than catalysts of the prior art, in some cases it may be possible to reduce the hydrocracking catalyst bed temperature by an amount commensurate with the increased activity of the catalysts of the invention. The liquid hourly space velocity (LHSV) typically is between 0.2 and 5 volumes of feedstock per hour per volume of catalyst, and preferably between 0.25 and 4.

Our copending application, Serial No. 408,579, filed Sept. 18, 1989, now abandoned, discloses additional details concerning the use of the products of the present invention in cracking and hydrocracking. The disclosure of that application is incorporated herein in its entirely by reference.

We claim:

1. A process for increasing the $Si/Al_2$ molar ratio and the thermal stability of a crystalline zeolite which comprises contacting and reacting a zeolite starting composition with a solution or slurry of a bifluoride salt in proportions such that there is from about 0.5 to 10 moles of bifluoride ion per mole of zeolitic framework aluminum, said contact between zeolite and bifluoride salt solution or slurry carried out at a temperature of from about 60° C. to 100° C. and the starting pH of the bifluoride salt solution being not greater than 7, whereby framework silicon and aluminum atoms are removed from the zeolite and at least some of the removed silicon atoms are inserted into sites vacated by removed aluminum atoms and the product zeolite has a crystal collapse temperature higher than that of the starting zeolite.

2. A process according to claim 1 wherein the zeolite starting material is a Y zeolite.

3. A process according to claim 2 wherein the Y zeolite starting material has a silica/alumina ratio of about 3.5 to about 5.5.

4. A process according to claim 1 wherein the zeolite starting material is in its ammonium form.

5. A process according to claim 1 wherein the bifluoride is ammonium bifluoride.

6. A process according to claim 1 wherein the bifluoride solution or slurry is an aqueous solution or slurry.

7. A process according to claim 1 wherein the solution or slurry contains from about 0.8 to about 9.7 moles per liter of bifluoride.

8. A process according to claim 1 wherein the bifluoride solution or slurry is contacted with the zeolite starting material at a pH in the range of about 3.0 to about 7.0.

9. A process according to claim 1 wherein the stabilized zeolite produced retains at least a major portion of the crystallinity of the zeolite starting material.

10. A process according to claim 9 wherein the stabilized zeolite produced retains at least about 75 percent of the crystallinity of the zeolite starting material.

11. A process according to claim 1 wherein the zeolite starting material has a silica/alumina ratio of less than about 5.5 and the stabilized zeolite produced has a silica/alumina ratio greater than about 6.0.

12. A process according to claim 1 wherein the stabilized zeolite produced has a silica/alumina ratio greater than about 6.0 and a $M^+/Al$ ratio of at least about 0.85.

* * * * *